United States Patent Office 3,382,748
Patented May 14, 1968

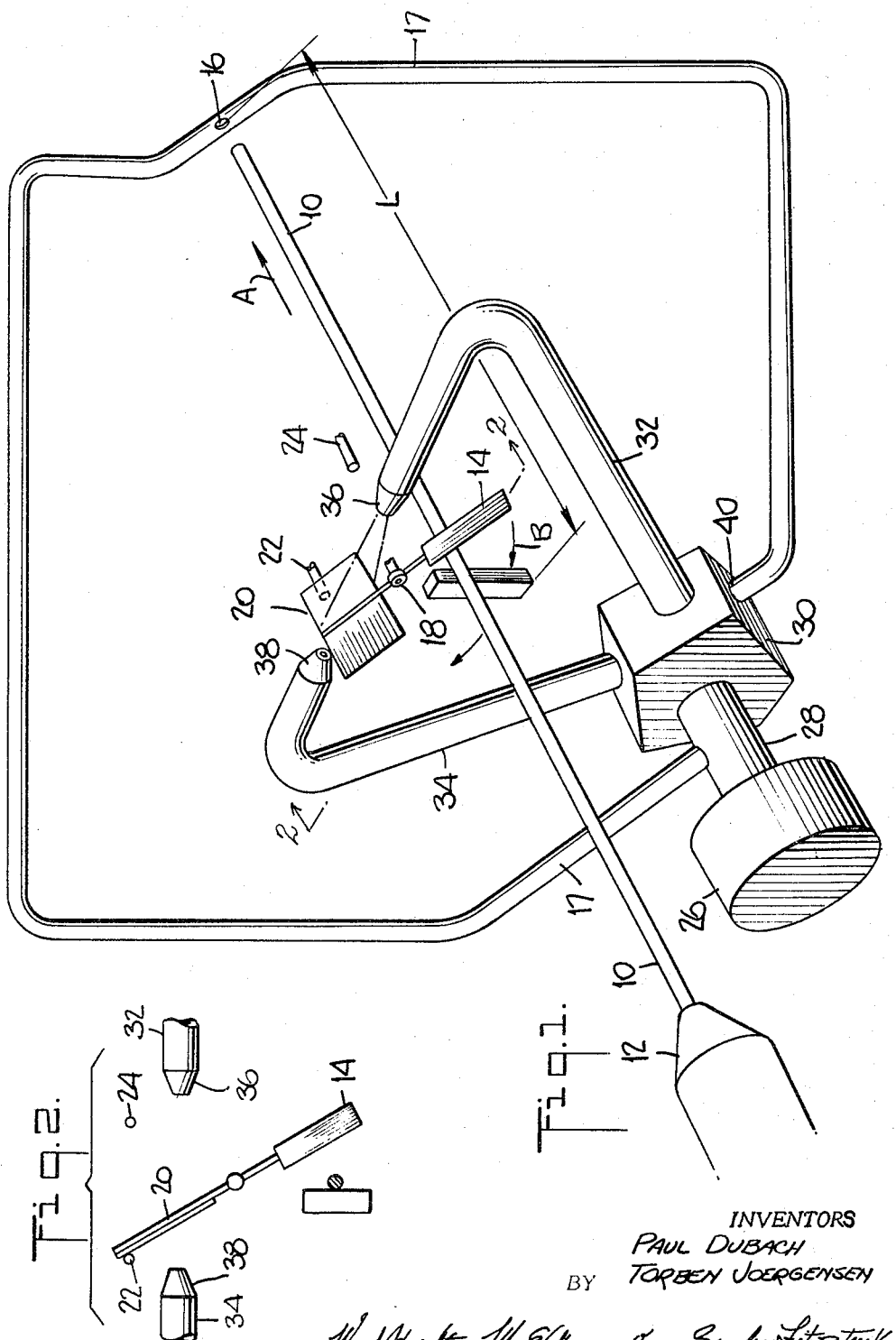

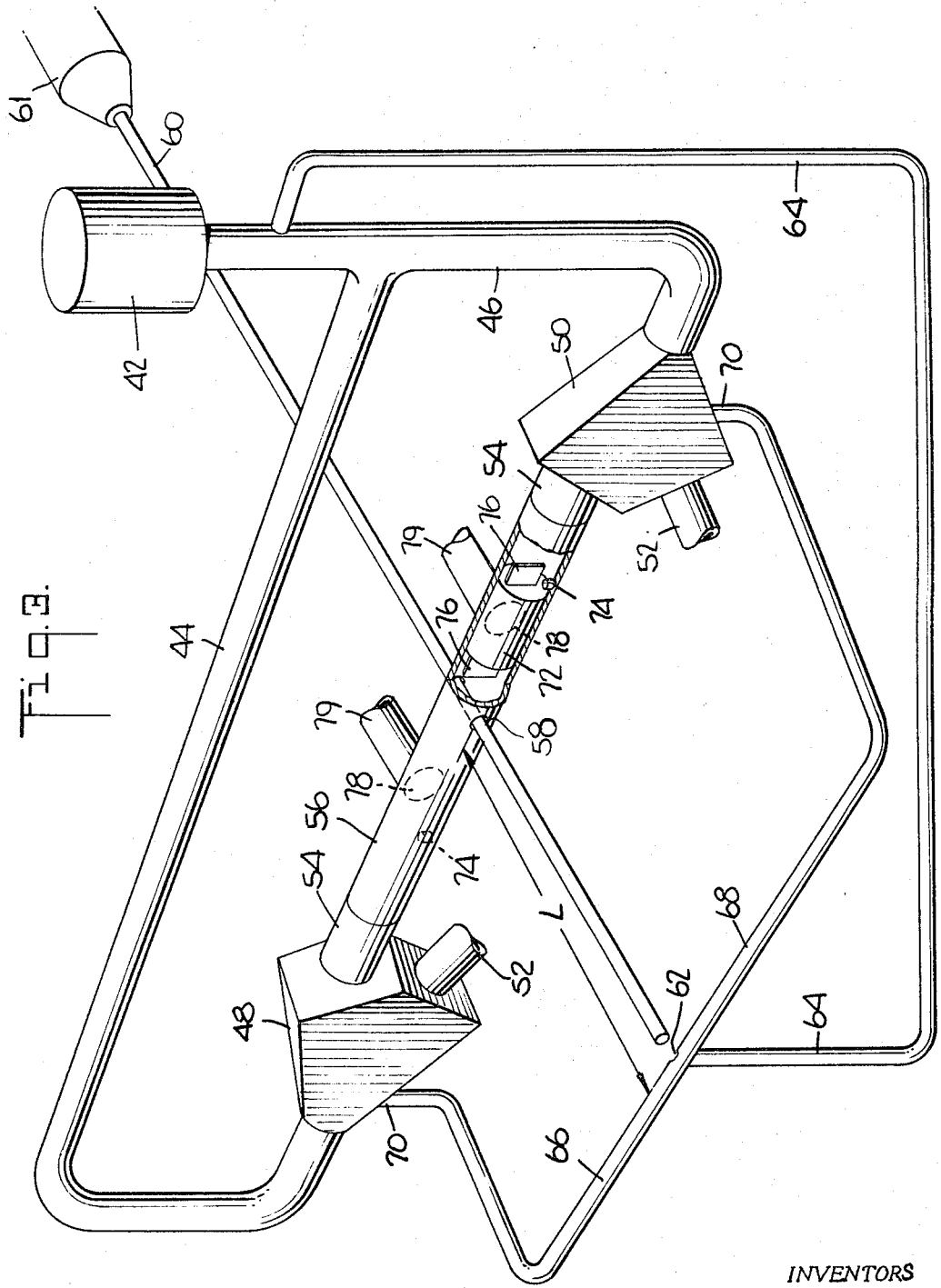

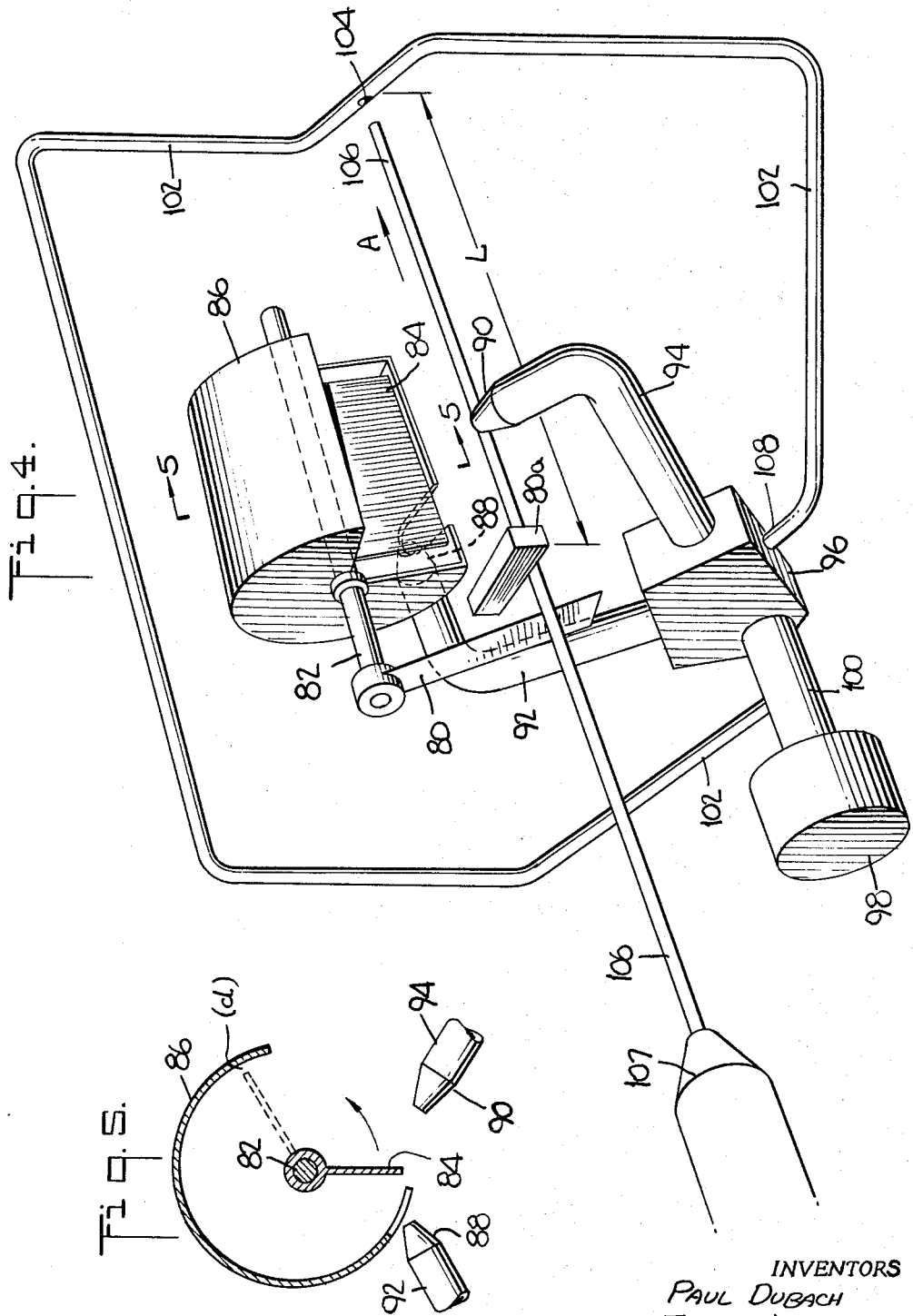

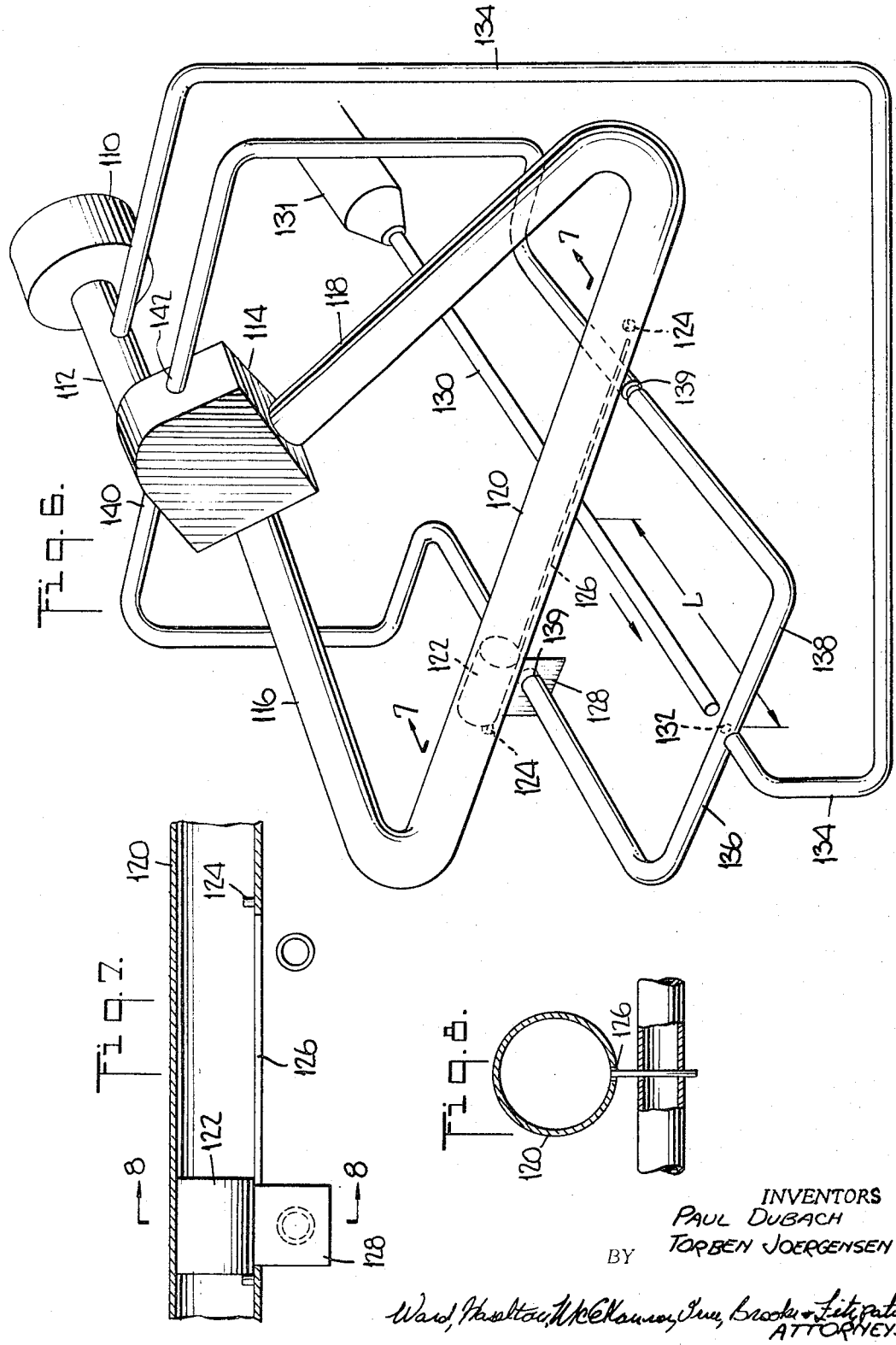

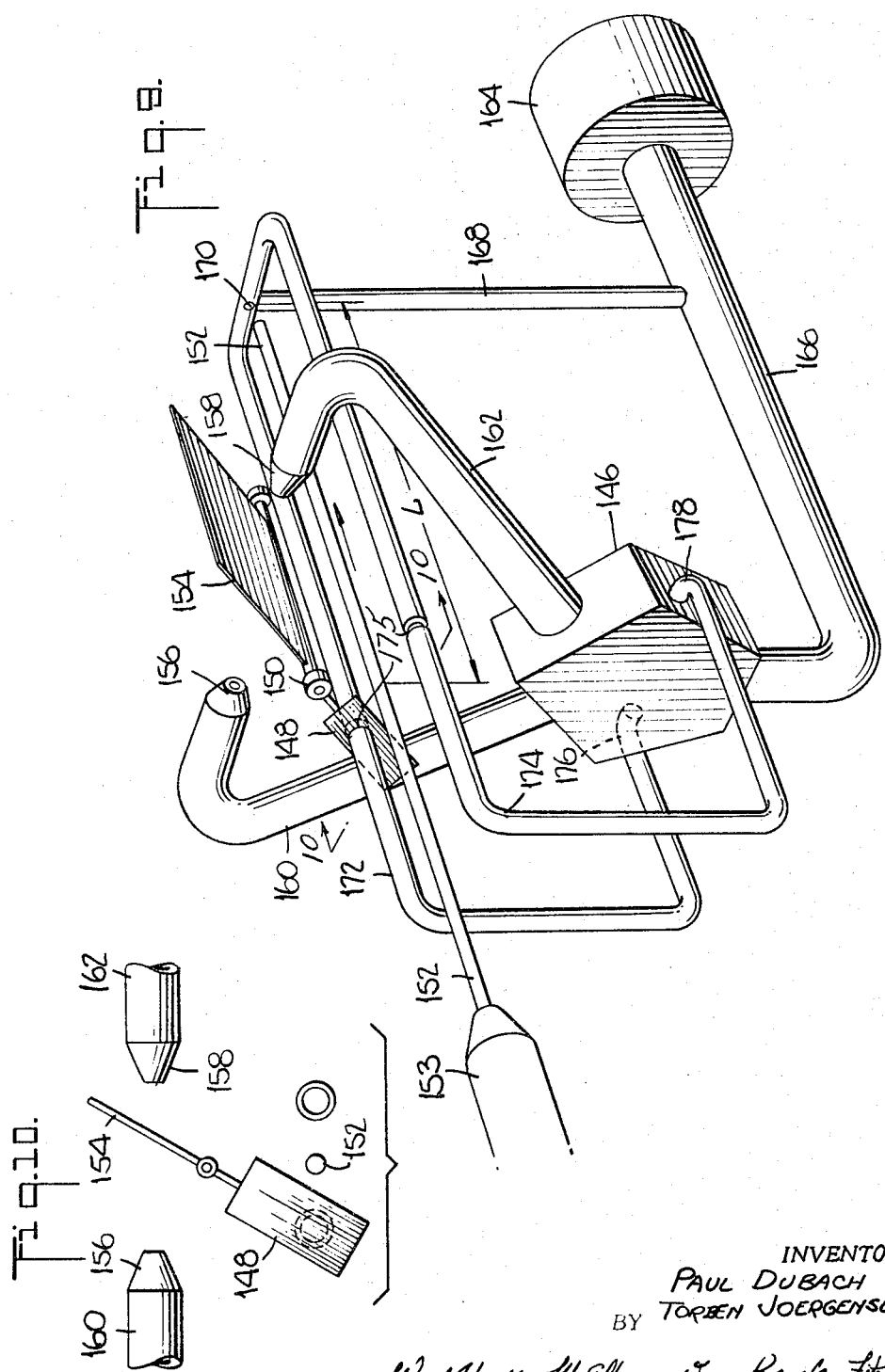

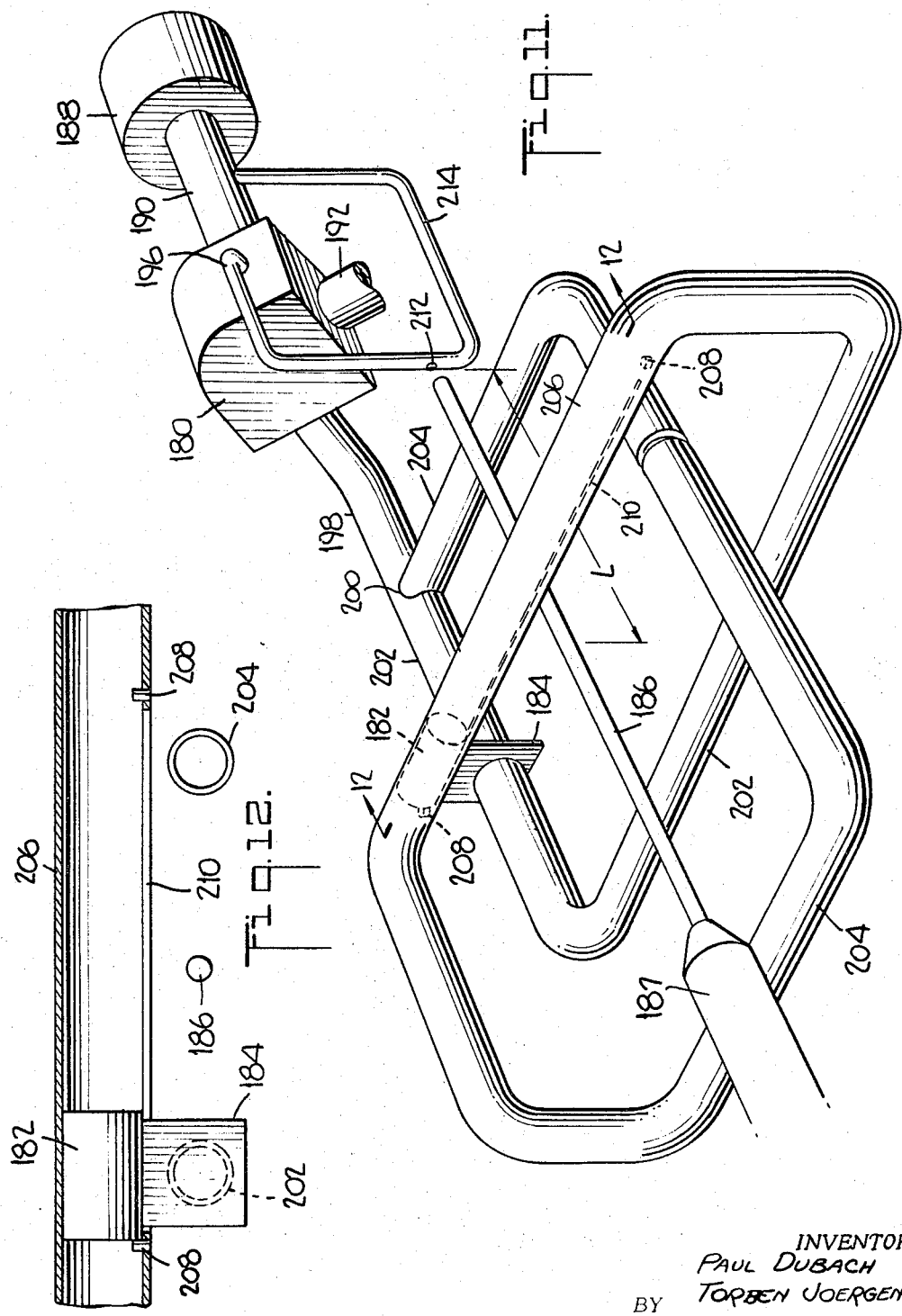

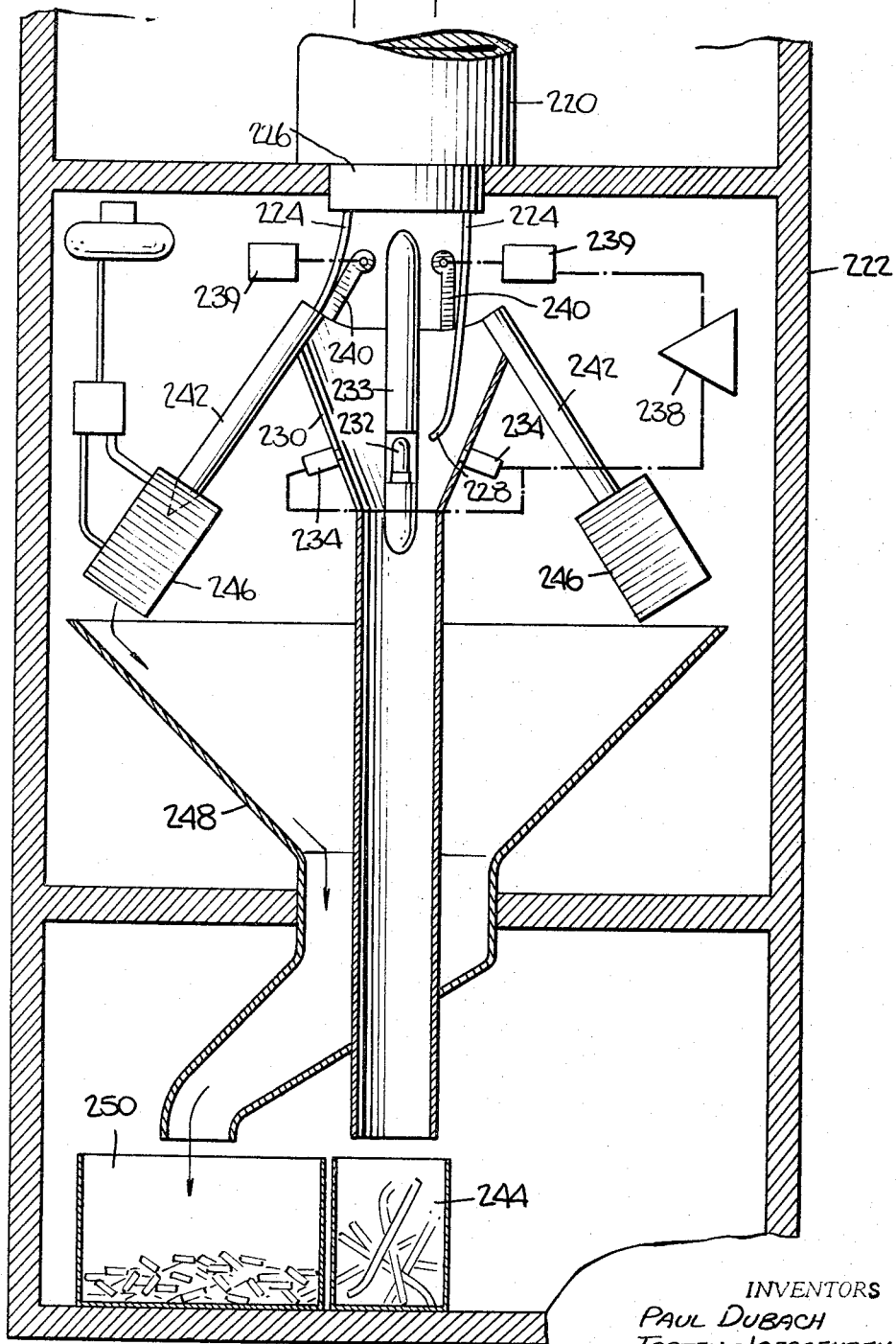

3,382,748
CUTTING APPARATUS
Paul Dubach and Torben Joergensen, Wattwil, Switzerland, assignors to Heberlein & Co. AG, Wattwil, St. Gall, Switzerland, a corporation of Switzerland
Filed June 21, 1966, Ser. No. 559,266
Claims priority, application Switzerland, June 30, 1965, 9,142/65
17 Claims. (Cl. 83—370)

ABSTRACT OF THE DISCLOSURE

Strand-like material to be cut into equal length pieces is advanced past a fluid power operated cutting element the desired distance to a distal point where it obstructs an aperture in the conduit carrying control fluid to one or more fluid amplifiers. The driving stream in at least one of the fluid amplifiers is switched upon obstruction of the aperture to cause actuation of the cutting element. Both monostable and bistable embodiments are described.

This invention relates to control systems and more particularly it concerns the use of switchable fluid circuits to achieve accurate and highly responsive control of various movable elements.

The present invention is particularly useful in connection with cutoff devices, such as are used to cut elongated strips or strings of material into equal length segments. Such materials may include, for example, thermoplastic filaments or fibers, gunpowder strands, foodstuffs such as spaghetti, and so forth. These materials are usually produced by extrusion; and they are ejected from an extrusion nozzle at very high and variable speeds.

In the past, these extruded or otherwise formed strip-like materials have been cut into equal lengths by constantly monitoring their speed of movement and then operating cutting knives at timed intervals based upon these speeds. This technique however is quite expensive to implement.

Another technique has involved the use of photoelectric cells which sense the passage of the end of a strand past a given point and produces a signal which is used to operate a cutting knife to sever the strand. The apparatus used in this technique is also rather expensive; and it is also cumbersome and limited in its speed of operation.

The present invention overcomes all of the above described disadvantages of the prior art. According to the present invention there is provided a control system which operates rapidly and efficiently to sever a continuous rapidly moving strand or strip into several equal length segments. This is accomplished, according to the present invention, by providing a fluid powered knife driving arrangement and controlling its operation by means of a fluid amplifier switch. The fluid amplifier switch is actuated by a transversely applied control stream, and this in turn is controlled by interception thereof by the end of the strip at a selected distance from the cutting knife.

More specifically, the strand is caused to be moved along continuously in a longitudinal direction past a knife blade and towards an aperture positioned some distance beyond the blade. The aperture is formed in a control fluid conduit and its interception by the end of the strand causes fluid to flow along inside the conduit rather than out through the aperture. This change in fluid flow is directed by the conduit to actuate a fluid amplifier switch. This in turn directs a power supply fluid along a path toward a fluid responsive knife operating mechanism. The strand is thus severed by the knife and the severed segment is removed so that the aperture is reopened until it again becomes intercepted by the cut end of the strand.

The system of the present invention provides many advantages among which are structural simplicity and compactness. The system is highly responsive and operates at high frequencies. Moreover, where the material being severed is explosive, the system of the present invention is quite safe for it does not require any heat or electrical energy in the vicinity of the material. Also, the fluid medium (such as air) serves to automatically free both the sensing and cutting portions of the apparatus of dust and other foreign materials which otherwise affect reliable operation.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Specific embodiments of the invention have been chosen for purposes of illustration and description, and are shown in the accompanying drawings, forming a part of the specification, wherein:

FIG. 1 is a perspective view showing a strand cutting system according to the present invention;

FIG. 2 is a fragmentary view taken along lines 2—2 of FIG. 1;

FIG. 3 is a perspective view of a modified strand cutting system according to the present invention;

FIG. 4 is a perspective view of another strand cutting system embodying the present invention;

FIG. 5 is a fragmentary view taken along lines 5—5 of FIG. 4;

FIG. 6 is a perspective view showing a further modification of the strand cutting system of the present invention;

FIG. 7 is a fragmentary section view taken along lines 7—7 of FIG. 6;

FIG. 8 is a further section view taken along lines 8—8 of FIG. 7;

FIG. 9 is a perspective view of another strand cutting arrangement embodying the present invention;

FIG. 10 is a fragmentary view taken along lines 10—10 of FIG. 9;

FIG. 11 is a perspective view of another modification of the strand cutting system of the present invention;

FIG. 12 is a section view taken along lines 12—12 of FIG. 11; and

FIG. 13 is a section view taken in elevation of a strand cutting and sorting system according to the present invention.

In the system shown in FIG. 1 a strand 10 is extruded continuously from an extrusion nozzle 12 and follows a path indicated by the arrow A. During its movement along this path, the strand 10 passes under a cutting knife 14 and moves toward an aperture 16 formed in a control conduit 17. The aperture 16 is located at a distance L from the knife 14, this distance being equal the length of the individual segments into which the strand 10 is to be cut.

The cutting knife 14 is mounted to move about a fixed pivot 18 in the direction of the arrow B between a normal position as shown, and a severing position. The knife movements are controlled in accordance with the movements of a fluid pressure responsive wing element 20 which is connected to the knife and extends in an opposite direction from the fixed pivot 18. A pair of wing stop elements 22 and 24 are provided to limit the normal and severing positions of the knife to less than 180° from each other.

A fluid pressure source 26 supplies pressurized fluid, such as air, via a main fluid conduit 28 to a monostable fluid amplifier 30. This fluid amplifier may take any of several forms known in the art. For example, it may be of the type which uses no moving parts. Such devices include aerodynamic amplifiers, jet amplifiers, swirl or vortex amplifiers, and turbulence amplifiers. On the other hand, it may contain one or more moving parts. These devices include piston amplifiers, diaphragm amplifiers and ball devices.

The fluid amplifier 30 transmits the fluid from the main conduit 28 into either of two branch conduits 32 and 34. The first branch conduit 32 is known as the stable branch and is the branch through which the fluid output from the amplifier 30 is normally passed. The second branch conduit 34 is known as the unstable branch, and it passes the fluid output from the fluid amplifier 30 only while a control signal is being applied to it.

The two branch conduits 32 and 34 terminate respectively in knife control nozzles 36 and 38 directed respectively against opposite sides of the wing element 20 so that the wing element will be shifted back and forth between normal and severing positions by the force of the fluid hitting the wing element 20 from the oppositely directed nozzles 36 and 38.

The control conduit 17 branches off from the main fluid conduit 28 and extends to the location of its aperture 16. The aperture 16 is sized and oriented such that it will eventually become effectively closed by the end of the strand 10. The control conduit 17 extends beyond the aperture 16 to a control input 40 in the monostable fluid amplifier 30.

During operation of the above described system, the strand 10 proceeds from the extrusion nozzle 12, under the knife 14 and toward the aperture 16. While this is occurring fluid from the main conduit 28 which passes through the control conduit 17 passes out through the aperture 16 which is unblocked. As a result, no fluid passes into the control input of the monostable amplifier 30; and it accordingly directs fluid from the main conduit 28 out through the first or stable branch conduit 32. This fluid passes through the associated knife control nozzle 36 and against the wing element 20 thus to hold the knife 14 in its normal or non-severing position as shown.

When the end of the strand 10 reaches the aperture 16 in the control conduit 17, it closes the aperture and prevents further escape of fluid therefrom. As a result, fluid in the control conduit 17 continues to flow toward the monostable fluid amplifier 30 and enters into it through the control input 40. When this occurs, the amplifier output becomes shifted from the first to the second or astable branch conduit 34. Consequently the fluid force from the first knife control nozzle 36 ceases and an oppositely directed fluid force is introduced via the second knife control nozzle 38. This shifts the wing element 20 and the knife 14 to their severing positions so that the knife will cut the strand 10 at a distance L from its end.

When the strand 10 is severed, the cut portion or segment is removed either by an air blast or by gravity. This opens the aperture 16 and, of course, removes fluid pressure from the amplifier input 40. The amplifier 30 thereupon reverts to its stable state whereby its fluid output passes through the first or stable branch 32 and the associated nozzle 36. The knife 14 thereupon reverts to its normal or non-severing position until the freshly cut end of the strand 10 reaches the aperture 16. When this occurs, the cycle is repeated so that the strand 10 is severed successively into several segments of a length L.

In the arrangement shown in FIG. 3, there is provided a fluid pressure source 42 which supplies pressurized fluid via two main fluid conduits 44 and 46 respectively to the inputs of two monostable fluid amplifiers 48 and 50. Each of the two monostable fluid amplifiers is provided with a stable output branch 52 and an astable output branch 54. The stable output branches 52 both discharge to the atmosphere as shown. The two astable output branches 54 are connected respectively to the opposite ends of a piston tube 56. The piston tube 56 is provided with a strand opening 58 extending therethrough and through which a strand 60 to be severed into equal length segments passes on its way from a nozzle 61 or other strand supply source. The strand 60 upon passing through the opening 58 traverses a distance L to an aperture 62 in a control conduit 64. The control conduit 64, as shown, is connected to receive fluid from the pressure source 42. Beyond the aperture 62, the control conduit 64 branches into two sections 66 and 68 respectively. These sections each terminate at a control input 70 of one of the monostable fluid amplifiers 48 and 50.

A piston 72 is located within the piston tube 56 for movement back and forth between two piston stops 74 located respectively on opposite sides of the strand opening 58. The piston 72 is provided on each end with a knife like cutting element 76. The piston tube 56 is additionally provided with valve openings 78 leading to the atmosphere via conduits 79. The valve openings 78 are located in positions to be covered by the piston 72 in each of its two extreme positions respectively.

During operation of the system of FIG. 3 fluid pressure from the source 42 is supplied via the main fluid conduits 44 and 46 to the monostable elements 48 and 50. Normally, these monostable elements direct the fluid supplied thereto up out through their stable output branches 52 to the atmosphere. During this time, the strand 60 proceeds through the strand opening 58 toward the aperture 62. Before the strand 60 reaches the aperture 62, fluid in the control conduit 64 will escape through the aperture and therefore will not affect the monostable fluid amplifiers 48 and 50. When however, the end of the strand 60 reaches the aperture 62 and closes it, fluid may no longer exit from the aperture and will therefore be directed along through the two conduit branches 66 and 68 to the control inputs 70 of the two monostable fluid amplifiers 48 and 50. When this occurs, both monostable fluid amplifiers will be switched simultaneously so that their outputs will be directed into their respective astable output branches 54. Assuming that initially the piston 72 is in its position as shown closest to the second monostable fluid amplifier 50, it will be acted upon by the fluid output from the astable output branch 54 of that amplifier. As a result, the piston will be impelled toward the second fluid amplifier 48. During its movement, the piston 72 will traverse the strand opening 58 and its cutting element 76 will sever the strand 60. The piston 72 will continue to move until it is stopped by the stop 74 near the first monostable fluid amplifier 48. Although the output of the first monostable fluid amplifier 48 has also been directed out through its astable output branch 54 and into the piston tube 56 from the opposite direction during this time, such fluid flow will have no appreciable effect upon the piston movement for this fluid flow will simply pass out to the atmosphere via the valve opening 78 and the conduit 79 in that section of the piston tube 56. It will be noted however that the valve opening 78 in the other end of the piston tube 56 is initially closed so that the entire force of the output from the second monostable fluid amplifier 50 will be directed against the piston causing it to move.

Once the strand 60 is severed as above described, the severed portion will fall away from the aperture 62 thereby causing the aperture to become reopened so that fluid pressure is removed from the control inputs 70 of both fluid amplifiers. As a result, the fluid amplifiers will revert to their stable state so that the fluid output from each of them will proceed through to their stable output branches 52. Thereafter the strand 60 will continue to move toward the aperture 62 until its freshly cut end again closes the aperture. When this occurs both monostable fluid amplifiers will be shifted to their astable state, thereby causing the piston 72 to be impelled in the reverse direction and to cut the strand 60 once again.

In the arrangement shown in FIGS. 4 and 5, there is provided a knife element 80 which is attached to a rotatable shaft 82. A vane member 84 is also attached to the shaft 82 and rotates with the shaft inside a partly opened cylindrical housing 86. A pair of nozzles 88 and 90 are directed respectively in opposite, generally tangential directions inside the housing 86 as shown. These nozzles are connected respectively to astable and stable output branches 92 and 94 of a monostable fluid amplifier 96. Fluid from a pressure source 98 is supplied via a main fluid conduit 100 to the amplifier 96. At the same time fluid from the source 98 is supplied through a control conduit 102 and out through an aperture 104 located in the path of a strand 106 at a distance L from the knife 80. The strand proceeds from an extrusion nozzle 107 in the direction of an arrow A, and passes between the knife 80 and a shear block 80a toward the aperture 104. The control conduit 102 extends beyond the aperture 104 to a control input 108 of the monostable fluid amplifier 96.

The axis 82 is excentrically mounted in the cylindrical housing 86, as shown in FIGURE 5. The vane 84, at the beginning of the operation is situated between the nozzles 88 and 90. If now the strand 106 reaches the aperture 104 and closes the same, the fluid in control conduit 102 is directed into the control input 108 of the monostable fluid amplifier 96, thereby causing its output to be switched from the stable branch 94 to the astable branch 92. This redirects fluid pressure out through nozzle 88 and against left side of vane 84. The movable parts, i.e. the knife 80, the axis 82 and the vane 84 are hereby rotated in counterclockwise direction. When this occurs, the knife 80 is swung through the path of the strand 106 and severs the strand. The severed portion of the strand then falls away from the aperture 104 so that it opens and effectively removes fluid pressure from the control input 108 of the fluid amplifier 96. As a result, the output of the fluid amplifier will revert to its stable branch 94 and its nozzle 90. When this occurs, the fluid output from the nozzle 90 will initially be directed at least partially in a circumferential direction about the inner surface of the housing 86 thereby retarding the vane 84, which in the meantime has passed the nozzle 90 and has reached a position as is e.g. shown by a dotted line in FIGURE 5. The movable system continues to rotate in counter-clockwise direction. The braking effect now increases, but not more than to make it still possible to bring vane 84 (and the knife 80) back to their original positions between the nozzles 88 and 90.

It will be appreciated that the arrangement of FIGURE 4 may be modified to provide simultaneous cutting with several vanes and associated knives.

FIGURES 6–8 show an arrangement of the present invention whereby use is made of a bistable type of fluid amplifier. As shown in FIGURE 6, there is provided a fluid pressure source 110 which supplies fluid pressure via a main conduit 112 to a bistable fluid amplifier device 114. The fluid amplifier device is provided with two stable output branches 116 and 118. These two branches are connected respectively to opposite ends of a piston tube 120 in which there is positioned a piston 122 which is movable back and forth within the piston tube 120 between two piston stops 124 located respectively at opposite ends of the tube 120. The piston tube 120 is additionally formed with a longitudinal slot 126 through which extends a knife element 128 which is attached to the piston 122. A strand 130 to be severed passes in close proximity to the piston tube 120 so that as the piston 122 moves back and forth therein, the knife 128 will sever the strand 130 into segments. The strand 130 moves from an extrusion nozzle 131 toward an aperture 132 located at a distance L from the piston tube 120. The aperture 132 is formed in a control conduit 134 which is connected to receive fluid pressure from the source 110.

Before the aperture 132 is covered by the end of the strand 130, fluid can flow out through the aperture. However, when the end of the strand 130 covers the aperture 132, fluid is then directed along through two branches 136 and 138 of the control conduit 134. These branches are arranged in the path of movement of the knife 128, and are broken as at 139 (FIGS. 7 and 8) so that the knife 128 will pass through and close off one conduit for each extreme position it takes. Thus whenever the aperture 132 is covered by the end of the strand 130, the fluid from the control conduit 134 will pass only through the unclosed branch conduit.

When the piston 122 is in the extreme left position as shown, the knife 128 closes off the branch conduit 136. The strand 130 then proceeds from the nozzle 131 toward the aperture 132. Upon reaching the aperture 132, the strand 130 closes it, so that the fluid in the control conduit 134 is directed toward its branch conduits. However, since the branch 136 is closed off by the knife 128, the control fluid passes through the branch 138 to a control input 142 of the bistable fluid amplifier 114. This switches the amplifier output from the branch 118 to the branch 116. As a result, the piston 122 is impelled to the other end of the tube 120. During this passage, the knife 128 severs the strand 130.

Since the fluid amplifier 114 is bistable, its output will continue through the branch 116 even after fluid pressure is removed from the control input 142. Thus the piston 122 and the knife 128 will remain at the right end of the tube 120, this time with the knife 128 closing the other branch 138 of the control conduit 134. Thus, when the end of the strand 130 again closes the aperture 132 fluid pressure will be directed only via the branch 136 to a control input 140 of the bistable fluid amplifier 114. This will switch the output of the amplifier back to its branch 118 and impell the piston 122 back to the left end of the tube 120, with the knife 128 again severing the strand 130.

FIGS. 9 and 10 show an arrangement similar to that of FIG. 1 but utilizing a bistable fluid amplifier 146 in place of the monostable fluid amplifier 30 of FIG. 1. As shown in FIG. 9, there is provided a knife 148 which moves about a fixed pivot 150 to sever a strand 152 which proceeds from an extrusion nozzle 153. The knife 148 is connected to a vane 154; and the vane in turn is acted upon alternately by fluid pressure from two nozzles 156 and 158 directed against opposite sides thereof. The nozzles 156 and 158 are connected respectively to branch conduits 160 and 162 of the bistable fluid amplifier 146. Fluid from a pressure source 164 is supplied via a main fluid conduit 166 to the bistable fluid amplifier 146. The pressure source 164 also supplies fluid to a control conduit 168. The control conduit 168 is formed with an aperture 170 located in the path of movement of the strand 152 at a distance L from the knife 148. Beyond the aperture 170, the control conduit 168 is divided into two branches 172 and 174 which are connected respectively to opposite control inputs 176 and 178 of the bistable amplifier 146.

As shown in FIG. 10, the knife 148 is switched back and forth between two non-cutting positions and during its passage from one position to another it severs the strand 152. As a result, it will be noted that there are provided two cutting edges on opposite sides of the knife. Also, in each of its extreme positions, the knife 148 enters into a slot 175 in one of the branch control conduits 172, 174 thereby closing off that branch control conduit. Thus when the aperture 170 is closed by the end of the strand 152, only the other control conduit will pass a fluid pulse to the bistable amplifier 146. This will allow the amplifier to switch to its alternate stable condition so that the output from the nozzles 156, 158 will be reversed and the knife 148 brought through the strand 152 to its alternate position.

The arrangement of FIGS. 11 and 12 permits the use of a monostable fluid amplifier 180 to shift a knife carrying piston 182 between two stable positions. This permits a knife 184 attached to the piston to cut a strand 186 from opposite directions thereby permitting the strand to move in close proximity to the knife without the knife having to return to an operative position by passing through the path of movement of the strand. As shown in FIG. 11, there is provided a fluid pressure source 188 which supplies fluid via a main conduit 190 to the monostable fluid amplifier 180. The fluid amplifier 180 is provided with a stable output branch 192 leading to the atmosphere. Output fluid from the monostable fluid amplifier 180 is directed out through the branch 192 in the absence of a fluid pressure input to a control input 196. The monostable fluid amplifier 180 is additionally provided with an astable output branch 198 which in turn splits at a junction 200 into two subbranches 202 and 204. Each subbranch passes under a piston tube 206 near opposite ends thereof respectively, and after so passing under the piston tube 206, each of the subbranches is connected to the end of the piston tube opposite the end near which it passed under the tube. The piston 182 is arranged to move back and forth in the tube 206 between stops 208 and when the piston 182 is in one of its two positions adjacent one of the stops 208, the knife 184 thereon blocks the particular subbranch 202 or 204 so that fluid cannot flow through such subbranch. Thus, with the piston 182 in its left hand position as shown, the fluid output from the monostable fluid amplifier 180, when switched to its astable branch 198, cannot pass through the subbranch 202 since the knife 184 blocks the subbranch. However, fluid can pass from the junction 200 via the subbranch 204 and into the left end of the piston tube 206. This then will cause the piston 182 to move toward the right end of the tube 206. When this occurs, the knife 184 will block the subbranch 204 and open the subbranch 202. Thereupon the next time that the monostable fluid amplifier 180 is switched so that its output proceeds via its astable branch 198, fluid flow instead of proceeding via the subbranch 204 will proceed via the subbranch 202 and into the right end of the piston tube 206 shifting the piston 182 back to its left hand position as shown.

As shown in FIG. 12, there is provided a slot 210 along the length of the piston tube 206 through which the knife 184 passes for attachment to the piston 182.

The strand 186 to be cut moves along from an extrusion nozzle 187 in close proximity to the piston tube 206 and across the path of movement of the knife 184 toward an aperture 212 in a control conduit 214 which leads to the control input 196 of the monostable fluid amplifier 180.

FIG. 13 shows an arrangement which permits very rapid cutting of several strands simultaneously. This arrangement also automatically eliminates and segregates first cuts, since very often extruded material is undesirably curled or thickened as a result of the initiation of the extrusion operation.

According to the arrangement of FIG. 13, an extruder 220 in the upper portion of a housing 222 causes a plurality of strands 224 to be emitted through a nozzle head 226. As shown at 228, the original ends of these strands are usually curved and of improper dimension and therefore not properly measurable.

Because of this, it is necessary to sever these strands and to discard them. This is accomplished as shown in FIG. 13 by providing a primary hopper 230 into which the strands are normally directed. A light source 232 is mounted on a support 233 which extends a certain distance down the length of the hopper 230 in the center thereof. A plurality of photoelectric cells 234 are distributed around the hopper 230 at radial position of each nozzle in the nozzle head 226.

The initial output of the nozzle head 226 produces curled end strands shown at 228, which proceed down into the primary hopper 230. Eventually each strand crosses the path between the light source 232 and its associated photoelectric cell 234. This causes the cell to emit a signal which is amplified in an associated amplifier 238. The amplifier output is then supplied to an associated solenoid 239 which causes a support arm 240 to pivot radially outward and intercept the strand. The strand is thus moved outward toward a channel 242. Upon traversing the edge of the channel 242 the strand is sharply severed so that a straight and cleanly cut end is formed on the strand. The cut off portion falls down through the primary hopper 230 into a first cut bin 244. The remainder of the strand meanwhile continues to proceed down through the channel 242 and into an associated fluid controlled severing device 246 which then cuts the strand into equal length segments. The severing devices 246 are arranged over a common hopper 248 which exhausts into a separate segment bin 250.

It will be seen that with the above arrangement the actually cut strand segments are automatically segregated and collected into a container which is separate from the container into which the undesirable first cuts are collected.

Having thus described the invention with particular reference to the preferred form thereof, it will be obvious to those skilled in the art to which the invention pertains, after understanding the invention, that various changes and modifications may be made therein without departing from the spirit and scope of the invention, as defined by the claims appended thereto.

What is claimed as new and desired to be secured by Letters Patent is:

1. Apparatus for cutting strand-like material into pieces of equal length comprising means for automatically and continuously advancing said material along a given path past a cutting station to a distal point, a conduit disposed at said distal point with an aperture therein across said path, a cutting element mounted for movement across said path at said cutting station for cutting said pieces from said material when the end thereof reaches and obstructs said aperture, fluid amplifier means constructed to contain at least one driving stream and at least one control stream, said conduit being coupled to said amplifier means to carry said control stream and arranged to inject said control stream into said driving stream when said aperture is obstructed, and conduit means coupled to said amplifier means to receive said driving stream when said control stream is injected therein and arranged to operatively convey said driving stream to said cutting element for causing it to sever said material.

2. Apparatus as in claim 1 wherein said fluid amplifier means is operated by air.

3. Apparatus as in claim 1 wherein said fluid amplifier means includes at least one monostable device.

4. Apparatus as in claim 1 wherein said fluid amplifier means includes at least one bistable device.

5. Apparatus as in claim 1 wherein said fluid amplifier means includes at least one monostable device, and wherein said cutting element is arranged in conjunction with said driving stream conduit means to provide two stable positions.

6. Cutting apparatus as in claim 1 wherein there is provided at least one vane movable by the driving stream and at least one knife serving as said cutting element and mounted on a rotatable shaft along with said vane.

7. Cutting apparatus as in claim 1 wherein there is provided a piston equipped with at least one knife which slides in a hollow cylinder through which the driving stream flows.

8. Cutting apparatus as in claim 7 wherein there are provided two control stream branches and two driving stream branches, said branches being arranged so that at least one becomes closed upon movement of said piston to each of two alternate positions.

9. Cutting apparatus as in claim 8 wherein branch closure is effected by passage of said cutting element into such branch.

10. Apparatus for cutting material at a given length comprising means for advancing said material along a given path, fluid amplifier means having a fluid input conduit, at least two fluid output conduits, and an internal configuration for selectively directing fluid out from various of said output conduits in accordance with the application of fluid pressure to a control input thereon, an element arranged to be moved in accordance with fluid flow, conduit means arranged in conjunction with said fluid output conduits for directing the flow from same in a manner such that said element is moved in accordance with the application of fluid pressure to said control input, a cutter connected to said element to be moved across said given path by movement of said element, and a fluid control conduit arranged to apply fluid pressure to said control input, said fluid control conduit being formed with an aperture located along said path in the direction of material movement whereby interception of said aperture by said material closes off said aperture and effects a change in fluid pressure at said control input.

11. Apparatus as in claim 10 wherein said element comprises a vane mounted for pivotal movement, and wherein said conduit means comprises separate conduits connected to different outputs of said fluid amplifier and terminating in nozzles directed respectively at opposite side of said vane.

12. Apparatus as in claim 10 wherein said element comprises a piston and wherein said conduit means comprises a piston tube, the opposite ends of which are connected to the output of said fluid amplifier means.

13. Apparatus as in claim 10 wherein said fluid amplifier means includes two monostable devices arranged with their astable outputs directed to move said element in opposite directions respectively and wherein said conduit means is arranged to become interrupted in different regions according to the position of said element thereby to effect bistable operation of said element.

14. Apparatus as in claim 10 wherein said conduit means comprises a piston tube connected at opposite ends to separate outputs of said fluid amplifier, and wherein said element comprises a piston moveable along said tube.

15. Apparatus as in claim 10 wherein said fluid amplifier means comprises a bistable device, said fluid control conduit being divided into two separate branches between said aperture and said fluid amplifier means and means arranged to effect closure of a different control conduit for each alternate position occupied by said element.

16. Apparatus as in claim 10 wherein said fluid amplifier comprises a single monostable device and wherein said conduit means includes a junction interconnecting the astable output of said monostable device to two branches the outputs of which are arranged to move said element in opposite directions respectively, and means arranged in conjunction with said element to close and open said branches alternately according to its position, thereby to effect bistable operation.

17. Apparatus as in claim 11 wherein there is provided a tubular housing of spiral-like configuration partially encircling said vane.

References Cited

UNITED STATES PATENTS

| | | | |
|---|---|---|---|
| 3,122,039 | 2/1964 | Sowers | 83—639 X |
| 3,122,045 | 2/1964 | Zilberfarb | 83—639 X |
| 3,148,563 | 9/1964 | Harley | 83—370 X |
| 3,156,148 | 11/1964 | Carr | 83—639 X |
| 3,174,316 | 3/1965 | Sigal | 83—370 X |
| 3,176,571 | 4/1965 | Reader | 83—639 |
| 3,191,858 | 6/1965 | Sowers | 234—107 X |

FOREIGN PATENTS 660,785    4/1963    Canada.

WILLIAM S. LAWSON, *Primary Examiner.*